(12) United States Patent
Park

(10) Patent No.: US 9,716,288 B2
(45) Date of Patent: Jul. 25, 2017

(54) RECHARGEABLE LITHIUM BATTERY AND METHOD OF PREPARING SAME

(71) Applicant: SAMSUNG SDI CO., LTD., Yongin-si, Gyeonggi-do (KR)

(72) Inventor: Se-Ho Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 231 days.

(21) Appl. No.: 13/950,245

(22) Filed: Jul. 24, 2013

(65) Prior Publication Data

US 2014/0113205 A1   Apr. 24, 2014

(30) Foreign Application Priority Data

Oct. 24, 2012 (KR) .................. 10-2012-0118492

(51) Int. Cl.
| | |
|---|---|
| *H01M 10/056* | (2010.01) |
| *H01M 10/058* | (2010.01) |
| *H01M 10/0525* | (2010.01) |
| *H01M 2/16* | (2006.01) |
| *H01M 10/052* | (2010.01) |
| *H01M 10/0569* | (2010.01) |

(52) U.S. Cl.
CPC ....... *H01M 10/056* (2013.01); *H01M 2/1653* (2013.01); *H01M 2/1686* (2013.01); *H01M 10/052* (2013.01); *H01M 10/058* (2013.01); *H01M 10/0525* (2013.01); *H01M 10/0569* (2013.01); *Y02P 70/54* (2015.11); *Y10T 29/49115* (2015.01)

(58) Field of Classification Search
CPC ............. H01M 2/1653; H01M 2/1686; H01M 10/052; H01M 10/0569; H01M 10/056; H01M 10/0525; H01M 10/058; Y10T 29/49115; Y02E 60/122
See application file for complete search history.

(56) References Cited

U.S. PATENT DOCUMENTS

| | | | |
|---|---|---|---|
| 6,753,114 B2 | 6/2004 | Jacobs et al. | |
| 7,087,269 B2 | 8/2006 | Lee et al. | |
| 7,087,349 B2 | 8/2006 | Kim et al. | |
| 2010/0209785 A1* | 8/2010 | Kawashima | H01M 2/021 429/338 |
| 2011/0165460 A1 | 7/2011 | Jito et al. | |
| 2012/0009483 A1* | 1/2012 | Chu | C01B 25/37 429/320 |
| 2012/0196191 A1 | 8/2012 | Jeon et al. | |
| 2012/0231337 A1* | 9/2012 | Miyata | C08J 3/05 429/217 |
| 2012/0244440 A1* | 9/2012 | Lee | H01M 4/131 429/217 |
| 2014/0170482 A1* | 6/2014 | Park | H01M 4/13 429/211 |

FOREIGN PATENT DOCUMENTS

| | | |
|---|---|---|
| JP | 2011-159619 A | 8/2011 |
| KR | 10-2001-0072575 A | 7/2001 |
| KR | 10-2002-0001035 A | 1/2002 |
| KR | 10-2002-0093781 A | 12/2002 |
| KR | 10-2003-0035521 A | 5/2003 |
| KR | 10-2012-0059441 A | 6/2012 |

OTHER PUBLICATIONS

KIPO Office Action dated Aug. 2, 2016, for corresponding Korean Patent Application No. 10-2012-00118492 (4 pages).
KIPO Office Action dated May 22, 2017, for corresponding Korean Patent Application No. 10-2017-0034006 (4 pages).

* cited by examiner

*Primary Examiner* — Muhammad Siddiquee
(74) *Attorney, Agent, or Firm* — Lewis Roca Rothgerber Christie LLP

(57) ABSTRACT

A rechargeable lithium battery and a method of preparing the same are described. The rechargeable lithium battery includes a positive electrode including a positive active material; a negative electrode including a negative active material; and a liquid electrolyte including a lithium salt and a non-aqueous organic solvent. A separator is interposed between the negative electrode and positive electrode and includes a support. A fluoro-based polymer layer is positioned on both sides of the support. The positive electrode includes the positive active material in an amount from about 30 to about 70 mg/cm$^2$.

6 Claims, 1 Drawing Sheet

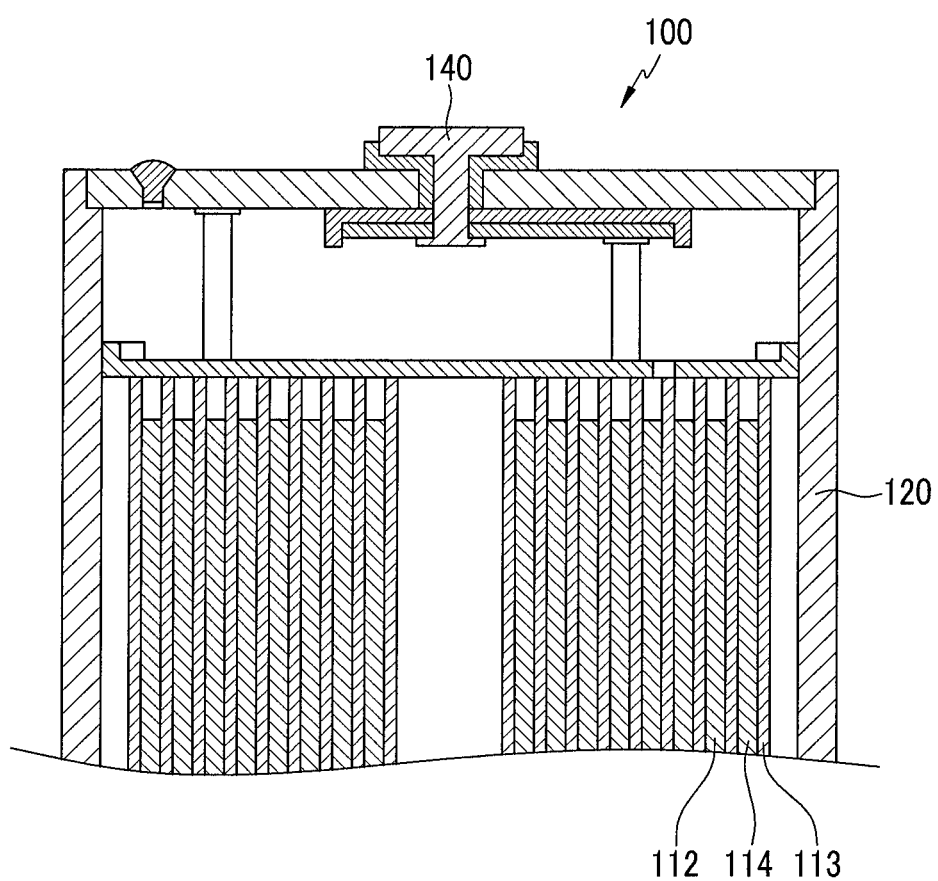

RECHARGEABLE LITHIUM BATTERY AND METHOD OF PREPARING SAME

CROSS-REFERENCE TO RELATED APPLICATION

This application claims priority to and the benefit of Korean Patent Application No. 10-2012-0118492 filed in the Korean Intellectual Property Office on Oct. 24, 2012, the entire content of which is incorporated herein by reference.

BACKGROUND

1. Field

This disclosure relates to a rechargeable lithium battery and a method of preparing the same.

2. Description of the Related Art

Rechargeable lithium batteries can be used as a power source for small portable electronic devices. They typically use an organic electrolyte and thereby may have two or more times the discharge voltage of a conventional battery using an alkali aqueous solution and accordingly, may have high energy density.

In general, rechargeable lithium batteries may be classified as lithium ion batteries, lithium ion polymer batteries, and lithium polymer batteries according to the presence of a separator and according to the kind of electrolyte that is used in the batteries. Rechargeable lithium batteries may have various shapes and sizes, including for example, cylindrical, prismatic, or coin-type batteries, as well as thin film or bulky batteries.

A conventional lithium polymer battery typically includes a gel polymer electrolyte to prevent distortion of a jelly roll, since an external pouch container is weaker than a prismatic or cylinder container. However, a lithium polymer battery using a gel polymer electrolyte typically has deteriorated rate capability compared with a cylindrical or prismatic battery using a liquid electrolyte solution. Accordingly, gel polymer electrolytes are typically not used together with a positive electrode having a positive active material loaded in a high amount. Furthermore, a battery with the gel polymer electrolyte has lower capacity than a battery with an electrolyte solution, even though the battery with the gel polymer electrolyte has the same volume to the battery with the electrolyte solution.

SUMMARY

Some embodiments of the present invention provide a rechargeable lithium battery having improved capacity characteristics and/or rate capability due to high current density.

Other embodiments of the present invention provide a method of preparing the rechargeable lithium battery.

A rechargeable lithium battery according to one embodiment comprises a positive electrode comprising from about 30 mg/cm² to about 70 mg/cm² of a positive active material; a negative electrode comprising a negative active material; a liquid electrolyte comprising a lithium salt and a non-aqueous organic solvent; and a separator interposed between the negative electrode and the positive electrode. The separator comprises a support having a fluoro-based polymer layer on each side of the support which is adapted to interface with a positive electrode or negative electrode.

In some embodiments, the positive electrode includes the positive active material in an amount from about 35 mg/cm² to about 65 mg/cm².

The positive electrode may have a thickness from about 90 μm to about 190 μm.

The non-aqueous organic solvent may be included in an amount greater than or equal to 20 volume % of a cyclic carbonate based on a total volume of the electrolyte.

The fluoro-based polymer may be, for example, polyvinylidene fluoride or the like.

The fluoro-based polymer layer may have a thickness from about 2 μm to about 6 μm.

The support may comprise two or more layers (e.g. being at least two-layered multi-layer) and may include a polyolefin-based polymer layer, such as polyethylene, polypropylene, and the like.

A method of preparing a rechargeable lithium battery according to another embodiment comprises preparing a positive electrode comprising from about 30 mg/cm² to about 70 mg/cm² of a positive active material; preparing a negative electrode; interposing a separator between the positive electrode and the negative electrode to provide an electrode assembly, the separator comprising a support and a fluoro-based polymer layer on each side of the support which interfaces with the positive electrode or the negative electrode; and injecting a liquid electrolyte comprising a lithium salt and a non-aqueous organic solvent into the electrode assembly.

Hereinafter, further embodiments of this disclosure will be described in detail.

The rechargeable lithium battery according to embodiments herein described includes a separator having adherence to an electrode, and thus can prevent, substantially prevent, or reduce distortion and wave of a jelly roll. Additionally, the rechargeable lithium battery according to embodiments, uses a liquid electrolyte instead of a gel polymer electrolyte, and thus may be applicable for use with an electrode having high current density and thus may have improved capacity characteristic and/or rate capability.

BRIEF DESCRIPTION OF THE DRAWING

The accompanying drawing, together with the specification, illustrate exemplary embodiments of the present invention, and, together with the description, serve to explain the principles of the present invention.

FIG. 1 is a schematic view showing a structure of a rechargeable lithium battery according to an embodiment.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

According to an embodiment of the present invention, a rechargeable lithium battery having improved capacity characteristic and/or rate capability is described. According to an embodiment, a separator that can adhere to an electrode of the rechargeable lithium battery is used to prevent, substantially prevent, or reduce distortion and/or wave of a jelly roll.

Additionally, a liquid electrolyte can be used instead of a gel polymer electrolyte to provide a battery with higher current density.

The rechargeable lithium battery according to embodiments herein described, comprises a positive electrode including a positive active material in an amount (herein also referred to as a "loading amount") from about 30 mg/cm$^2$ to about 70 mg/cm$^2$; a negative electrode comprising a negative active material; a liquid electrolyte comprising a lithium salt and a non-aqueous organic solvent; and a separator interposed between the negative electrode and positive electrode. The separator comprises a support having a fluoro-based polymer layer on each side of the support which is adapted to interface with a positive electrode or negative electrode.

FIG. 1 is a schematic showing an exploded perspective view of a rechargeable lithium battery according to one embodiment. In the exemplary embodiment shown schematically in FIG. 1, the rechargeable lithium battery 100 comprises a positive electrode 112; a negative electrode 114; a separator 113 disposed between the positive electrode 112 and negative electrode 114; an electrolyte impregnated in the positive electrode 112, negative electrode 114, and separator 113; a battery case 120; and a sealing member 140 sealing the battery case 120. The rechargeable lithium battery 100 according to the embodiment shown schematically in FIG. 1 can be fabricated, for example, by sequentially stacking the positive electrode 112, the separator 113, and the negative electrode 114 to provide an electrode assembly; spiral-winding the electrode assembly; and housing the spirally-wound electrode assembly in the battery case 120.

In the embodiment shown in FIG. 1, the positive electrode 112 includes a current collector and a positive active material layer disposed on the current collector.

The positive active material comprises one or more of a compound that can reversibly intercalate and deintercalate lithium ions, herein also referred to as a "lithiated intercalation compound". The positive active material may include but is not limited to a composite oxide including at least one metal selected from the group consisting of cobalt, manganese, nickel, and lithium. Exemplary lithiated intercalation compounds according to embodiments of the present disclosure, include one or more compounds selected from compounds having the following formulas: $Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $LiE_{2-b}R_bO_{4-c}D_c$ (0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aN-i_bE_cG_dO_2$ (0.90≤a≤1.8, 0≤b≤0.9, 0≤c≤0.5 and 0.001≤d≤0.1); $Li_aNi_bCo_cMn_dG_eO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulas, A includes, but is not limited to, Ni, Co, Mn, or a combination thereof; R includes but is not limited to Al, Ni, Co, Mn, Cr, Fe, Mg, Sr, V, a rare earth element, or a combination thereof; D includes but is not limited to O, F, S, P, or a combination thereof; E includes but is not limited to Co, Mn, or a combination thereof; Z includes but is not limited to F, S, P, or a combination thereof; G includes but is not limited to Al, Cr, Mn, Fe, Mg, La, Ce, Sr, V, or a combination thereof; Q includes but is not limited to Ti, Mo, Mn, or a combination thereof; T includes but is not limited to Cr, V, Fe, Sc, Y, or a combination thereof; and J includes but is not limited to V, Cr, Mn, Co, Ni, Cu, or a combination thereof.

Lithiated intercalation compounds according to some embodiments may have a coating layer on the surface or may be mixed with a compound having a coating layer. The coating layer may include one or more of, but is not limited to a coating element compound selected from the group consisting of an oxide of a coating element, a hydroxide of a coating element, an oxyhydroxide of a coating element, an oxycarbonate of a coating element, and a hydroxylcarbonate of a coating element. The compounds for a coating layer may be amorphous or crystalline. The coating element for a coating layer may include but is not limited to Mg, Al, Co, K, Na, Ca, Si, Ti, V, Sn, Ge, Ga, B, As, Zr, or a mixture thereof. The coating layer can be formed by using a method having no negative influence or reduced negative influence on properties of the positive active material by including these elements. Exemplary methods for providing a coating layer include but are not limited to spray coating, dipping or the like, or other methods known to a person skilled in the art.

According to embodiments herein described, the higher the loading amount of the positive active material, the higher current density may be. In embodiments where the positive active material is loaded in a large amount (e.g. greater than about 70 mg/cm$^2$), rate capability may deteriorate and may cause cracking in the positive active material layer. When the positive active material is loaded in a small amount (e.g. less than about 30 mg/cm$^2$), a battery may have a lower capacity using the same volume of the positive active material. According to embodiments of the present disclosure, the positive active material may be loaded in an amount from about 30 mg/cm$^2$ to about 70 mg/cm$^2$ and preferably from about 35 mg/cm$^2$ to about 65 mg/cm$^2$, to provide a desired current density.

The positive active material layer may comprise a binder and/or a conductive material.

The binder can improve binding properties of the positive active material particles to each other and to the current collector. Exemplary binders include but are not limited to polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and mixtures thereof.

The conductive material can improve electrical conductivity of a positive electrode. Suitable conductive materials include those which can avoid or substantially avoid causing a chemical change. Exemplary conductive materials include, but are not limited to a carbon-based material such as natural graphite, artificial graphite, carbon black, acetylene black, ketjen black, or carbon fiber; a metal-based material of a metal powder or metal fiber (or the like) including one or more metals such as copper, nickel, aluminum, silver, or the like; a conductive polymer material such as a polyphenylene derivative; or a combination thereof.

The current collector may include, but is not limited to an aluminum foil, a copper foil, a nickel foil, a stainless steel foil, a titanium foil, a nickel foam, a copper foam, a polymer substrate coated with a conductive metal, or a combination thereof. In one embodiment, an aluminum foil may be preferred.

Using the positive active material loading amounts herein described, the positive electrode 112 may be from about 90 µm thick to about 190 µm thick and preferably from about 100 µm thick to about 180 µm thick, which can provide the battery with a high rate capability.

According to some embodiments, the negative electrode 114 comprises a current collector on which a layer of the negative active material is formed.

The negative active material according to embodiments, includes but is not limited to a material that reversibly intercalates/deintercalates lithium ions, a lithium metal, a lithium metal alloy, a material capable of doping lithium, a transition metal oxide, or a combination thereof.

Materials that reversibly intercalate/deintercalate lithium ions include but are not limited to carbon materials. The carbon materials include but are not limited to one or more carbon-based negative active materials generally used in lithium ion rechargeable batteries. Exemplary carbon materials include, but are not limited to crystalline carbon, amorphous carbon, or a combination thereof. Crystalline carbon materials include, but are not limited to non-shaped or shaped (e.g. sheet, flake, spherical, fiber-shaped) natural graphite or artificial graphite, or a combination thereof. The amorphous carbon may be a soft carbon, a hard carbon, a mesophase pitch carbonized product, fired coke, or the like, or a combination thereof.

Exemplary lithium metal alloys include, but are not limited to an alloy comprising lithium and one or more of a metal selected from the group consisting of Na, K, Rb, Cs, Fr, Be, Mg, Ca, Sr, Si, Sb, Pb, In, Zn, Ba, Ra, Ge, Al, and Sn.

Exemplary materials capable of doping and dedoping lithium include but are not limited to one or more of Si, $SiO_x$ (0<x<2), a Si—$X_1$ alloy (wherein $X_1$ is an alkali metal, an alkaline-earth metal, a Group 13 to 16 element (excluding Si), a transition element, a rare earth element, or a combination thereof), Sn, $SnO_2$, a Sn—$X_2$ alloy (wherein $X_2$ is an alkali metal, an alkaline-earth metal, a Group 13 to 16 element (excluding Sn), a transition element, a rare earth element, or a combination thereof), or the like. At least one of the materials capable of doping and dedoping lithium may be mixed with $SiO_2$.

$X_1$ and $X_2$ may be independently selected, and may include, but are not limited to Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include one or more of vanadium oxide, lithium vanadium oxide, or the like.

According to some embodiments, the negative active material layer comprises a binder, and/or a conductive material.

The binder improves binding properties of active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the negative active material.

The conductive material can improve electrical conductivity of a negative electrode. Suitable conductive materials include those which can avoid or substantially avoid causing a chemical change. Exemplary conductive materials include, but are not limited to a carbon-based material such as natural graphite, artificial graphite, carbon black, acetylene black, ketjen black, or a carbon fiber; a metal-based material of a metal powder or a metal fiber (or the like) including one or more metals such as copper, nickel, aluminum, silver, or the like; a conductive polymer material such as a polyphenylene derivative; or a combination thereof.

The current collector may include, but is not limited to a copper foil, a nickel foil, a stainless steel foil, a titanium foil, a nickel foam, a copper foam, a polymer substrate coated with a conductive metal, or a combinations thereof.

A separator 113 is interposed between the positive electrode 112 and the negative electrode 114.

The separator 113 comprises a support and a fluoro-based polymer layer formed on each side of the support which is adapted to interface with an electrode.

In some embodiments, the support may be at least a two-layered multi-layer support. The support may comprise a polyolefin-based polymer layer such as polyethylene, polypropylene, or the like, or a combination thereof.

According to some embodiments, the fluoro-based polymer may adhere to an electrode and may prevent, substantially prevent, or reduce distortion and/or wave of a jelly roll. The fluoro-based polymer may comprise polyvinylidene fluoride or the like.

In embodiments, where the fluoro-based polymer layer is thick (e.g. greater than about 6 µm), rate capability may be deteriorated. Therefore, in some embodiments, the fluoro-based polymer layer is from about 2 µm to about 6 µm thick, which may provide improved processability and rate capability.

According to some embodiments, the positive electrode 112, the negative electrode 114, and the separator 113 are impregnated with an electrolyte.

In some embodiments, the electrolyte is a liquid electrolyte comprising a lithium salt and a non-aqueous organic solvent. In embodiments where a liquid electrolyte is used, a positive electrode with a high density can be used.

In these embodiments, the lithium salt is dissolved in an organic solvent and supplies the battery with lithium ions, which can improve lithium ion transportation between the positive and negative electrodes therein. Exemplary lithium salts include, but are not limited to $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are non-zero natural numbers), LiCl, LiI, $LiB(C_2O_4)_2$ (lithium bis(oxalato) borate, LiBOB), or a mixture thereof.

The lithium salt may be used in a concentration ranging from 0.1 M to 2.0 M. When the lithium salt is included at the above concentration range, an electrolyte may have improved performance and lithium ion mobility due to optimal electrolyte conductivity and viscosity.

The non-aqueous organic solvent may serve as a medium for transmitting ions taking part in the electrochemical reaction of a battery, and the non-aqueous organic solvent may include, but is not limited to a carbonate-based, ester-based, ether-based, ketone-based, alcohol-based, or aprotic solvent.

The carbonate-based solvent may include, but is not limited to dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC). The ester-based solvent may include, but is not limited to γ-butyrolactone, decanolide, valerolactone, mevalonolactone, caprolactone, and the like. The ether-based solvent may include, but is not limited to dibutyl ether, tetraglyme, diglyme, dimethoxyethane, 2-methyltetrahydrofuran, tetrahydrofuran, and the like. The ketone-based solvent may include, but is not limited to cyclohexanone, and the like. The alcohol-based solvent may include, but is not limited to ethanol, isopropyl alcohol, and the like. The aprotic solvent may include, but is not limited to a compound having the formula R—CN (wherein R is a C2 to C20 linear, branched, or cyclic hydrocarbon group, or may include, but is not limited to a double bond, an aromatic ring, or an ether bond), amides such as dimethylformamide, dioxolanes such as 1,3-dioxolane, sulfolanes, or the like.

The non-aqueous organic solvent may be used singularly or in a mixture including two or more of the above-mentioned solvents. When the organic solvent is used in a mixture, the mixture ratio may be controlled in accordance with a desired battery performance, which will be understood by a person skilled in the related art.

The non-aqueous organic solvent may include, but is not limited to a cyclic carbonate in an amount greater than or equal to about 20 volume % and preferably, in an amount ranging from about 30 volume % to about 60 volume %, based on a total volume of the electrolyte. When the cyclic carbonate is included within the above recited ranges, cycle-life characteristic of a battery may be improved.

The non-aqueous organic solvent may be further prepared by mixing one or more of a carbonate-based solvent with one or more of an aromatic hydrocarbon-based solvent. The one or more of a carbonate-based solvent and the one or more of an aromatic hydrocarbon-based solvent may be mixed together in a volume ratio ranging from about 1:1 to about 30:1.

The aromatic hydrocarbon-based organic solvent may be an aromatic hydrocarbon-based compound represented by the following Chemical Formula 1.

[Chemical Formula 1]

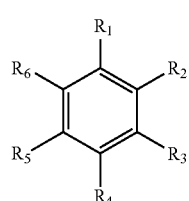

In Chemical Formula 1, $R_1$ to $R_6$ are each independently selected from the group consisting of hydrogen, a halogen, a C1 to C10 alkyl group, a C1 to C10 haloalkyl group, or a combination thereof.

The aromatic hydrocarbon-based organic solvent may include one or more of, but is not limited to benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4,-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The rechargeable lithium battery according to some embodiments may be fabricated by a method comprising preparing a positive electrode and a negative electrode; preparing an electrode assembly by interposing a support having a fluoro-based polymer layer disposed on each side of the support adapted to interface with an electrode, between the positive electrode and negative electrode; and impregnating an electrolyte solution into the electrode assembly.

A method of fabricating a rechargeable lithium battery is now described (step by step) by way of example and not of limitation. First, positive and negative electrodes are fabricated.

The positive and negative electrodes may be fabricated by mixing a respective active material, a binder, a conductive material, and other additives in a solvent such as N-methylpyrrolidone, water, and the like to prepare a positive or a negative electrode slurry; coating the slurry onto a current collector; and drying and compressing the slurry.

The method of fabricating electrodes may be performed by any general technique. In some embodiments the positive electrode may be fabricated by adjusting the compression condition of loading a positive active material in an amount of 30 mg/cm² to 70 mg/cm².

Next, an electrode assembly is formed by interposing a separator between each positive and negative electrode.

The separator may be fabricated by a conventional method of manufacturing of a separator with a multi-layered polymer structure (e.g. a method of coating a fluoro-based polymer on both sides of a polyolefin-based polymer film as a support).

For example, the separator may be prepared by dipping the supporter in a polyolefin-based polymer liquid and drying it. In the polyolefin-based polymer liquid, a solvent may be dimethyl acetamide, acetone, or a combination thereof. The polyolefin-based liquid has a concentration of about 5 wt % to 50 wt %. Furthermore, the dipping may be performed for 10 minutes to 30 minutes, and the drying may be performed at 58° C. to 100° C. for 10 minutes to 30 minutes.

The fluoro-based polymer may be included in the separator to make a fluoro-based polymer layer that is about 2 μm to about 6 μm thick.

An electrode assembly may be formed by interposing the separator between the positive and negative electrodes to provide an electrode assembly. The electrode assembly may be spirally wound, compressed, and inserted in a pouch by a conventional method.

The rechargeable lithium battery may then be provided by impregnating the electrode assembly with the liquid electrolyte (e.g. by inserting a liquid electrolyte comprising a lithium salt and a non-aqueous organic solvent into the electrode assembly).

The rechargeable lithium battery manufactured in the method according to embodiments herein described comprises a separator which may adhere to the electrode to prevent, substantially prevent, or reduce distortion and/or wrinkling of the electrode assembly jelly roll. According to further embodiments, when a liquid electrolyte is used, an electrode having high current density can be used. In these embodiments, the rechargeable lithium battery can have an improved capacity characteristic and/or rate capability.

The following examples illustrate the present invention in more detail. These examples, however, should not in any sense be interpreted as limiting the scope of the present invention.

EXAMPLE 1

A positive electrode slurry was prepared by mixing $LiCoO_2$ as a positive active material, polyvinylidene fluoride (PVDF) as a binder, and carbon black as a conductive material in a weight ratio of 97:1.5:1.5, and dispersing the mixture in N-methyl-2-pyrrolidone. The positive electrode slurry was coated on a 12 μm-thick aluminum film as a current collector and then, dried and compressed, to provide a positive electrode. The positive electrode included a positive active material in a loading amount of 30.00 mg/cm$^2$ and was 90.0 μm thick, excluding the thickness of the current collector.

A negative electrode slurry was prepared by mixing graphite as a negative active material, a styrene-butadiene rubber as a binder, and carboxylmethylcellulose as a thickener in a weight ratio of 98:1:1, and dispersing the mixture in water. The negative electrode slurry was coated on a 8 μm-thick copper foil as a current collector and then, dried and compressed to provide a negative electrode.

A polyethylene separator (8 to 10 μm thick) coated 2 μm thick on both sides with polyvinylidene fluoride was interposed between the positive electrodes and negative electrodes to provide an electrode assembly.

The polyethylene separator was prepared by dipping a polyethylene supporter in a polyvinyldene fluoride liquid (solvent: acetone, concentration of 5 wt %) for _10 minutes and drying it at 80° C. for 10_minutes.

The electrode assembly was spiral-wound, compressed, and inserted in a 4.2 mm×33 mm×80 mm (thickness×width× height) pouch. Herein, the spirally-wound jelly roll was 3.4 mm thick. Then, a non-aqueous electrolyte was prepared by dissolving 1M of $LiPF_6$ in a mixed solvent of ethylenecarbonate (EC)/ethylmethylcarbonate (EMC)/diethylcarbonate (DEC) mixed in a volume ratio of 1:1:1 based on the total weight of the non-aqueous electrolyte and then, injected an opening of the pouch. The pouch was sealed and was vacuumed for 60 seconds followed by sealing the opening.

The sealed product was compressed with a pressure of 100° C./250 kgf for 30 seconds to provide a rechargeable lithium battery cell.

EXAMPLES 2 to 7

Rechargeable lithium battery cells were fabricated according to the same method as Example 1, with the exception that the loading amount (L/L) of the positive active material and the thickness of the electrode were varied as provided in the following Table 1.

TABLE 1

|  | L/L(mg/cm$^2$) | thickness of electrode (μm) |
| --- | --- | --- |
| Example 1 | 30.00 | 90.0 |
| Example 2 | 35.00 | 100.0 |
| Example 3 | 40.00 | 115.0 |
| Example 4 | 50.00 | 140.0 |
| Example 5 | 60.00 | 170.0 |
| Example 6 | 65.00 | 180.0 |
| Example 7 | 70.00 | 190.0 |

COMPARATIVE EXAMPLE 1

A lithium polymer battery cell was fabricated according to the same method as Example 1 except for using a gel polymer electrolyte prepared by adding 500 ppm of an initiator (2,2'-azobis(2.4-dimethyl valeronitrile)) to a mixed solvent of ethylenecarbonate (EC)/ethylmethylcarbonate (EMC)/diethylcarbonate (DEC) mixed in a volume ratio=1:1:1 based on the total weight of the non-aqueous electrolyte and dissolving 1M of $LiPF_6$ therein.

COMPARATIVE EXAMPLES 2 to 7

Lithium polymer battery cells were fabricated according to the same method as Comparative Example 1 with the exception that the loading amount (L/L) of the positive active material and the thickness of the electrode were varied as provided in the following Table 2.

TABLE 2

|  | L/L(mg/cm$^2$) | Thickness of electrode (μm) |
| --- | --- | --- |
| Comparative Example 1 | 30.00 | 90.0 |
| Comparative Example 2 | 35.00 | 100.0 |
| Comparative Example 3 | 40.00 | 115.0 |
| Comparative Example 4 | 50.00 | 140.0 |
| Comparative Example 5 | 60.00 | 170.0 |
| Comparative Example 6 | 65.00 | 180.0 |
| Comparative Example 7 | 70.00 | 190.0 |

EXPERIMENTAL EXAMPLE 1

The cells according to Example 1 and Comparative Example 1 were respectively charged at room temperature of 25° C. with a current of 1000 mA under 4.35V CC/CV 60 mA and discharged with a current of 1000 mA at 2.75V, which was one cycle formation. After a 10 minute pause, the cells were charged at room temperature with a current of 1000 mA under 4.35V CC/CV 60 mA and discharged with a current of 1000 mA to 3.0V as one cycle and then, the capacity was measured. The results are provided in the following Table 3.

TABLE 3

|  | Capacity (mAh) |
| --- | --- |
| Example 1 | 1700 |
| Comparative Example 1 | 1600 |

As shown in Table 3, the rechargeable lithium battery cell including liquid electrolyte according to Example 1 had an improved capacity characteristic compared with the lithium polymer battery including a gel polymer electrolyte according to Comparative Example 1.

EXPERIMENTAL EXAMPLE 2

The capacities of the cells according to Examples 1 to 7 and Comparative Examples 1 to 7 were measured using the same method as Experimental Example 1 and were tested about C-rate at room temperature of 25° C.

The cells were charged under the charge condition of 4.35V CC/CV 60 mA with a current of 1000 mA during all C-rate tests. For the 0.5 C test, discharge was performed with a current of 800 mA and a voltage of 3.0V, for the 1.0 C test, discharge was performed with a current of 1600 mA and a voltage of 3.0V, for the 1.5 C test, discharge was performed with a current of 2400 mA and a voltage of 3.0V, and for the 2.0 C test, discharge was performed with a current of 3200 mA and a voltage of 3.0V. Then, C-rate capability was examined depending on thickness of an electrode. The results are provided in Table 4 in consecutive order of Example/Comparative Example number. In Table 4, the % refers to percentages of capacity at each rate to capacity at 0.5 C. That is, the capacity at 0.5 C was set to 100%.

TABLE 4

| L/L (mg/cm$^2$) | Thickness of electrode (μm) | C-rate | Example (%) | Comparative Example (%) |
| --- | --- | --- | --- | --- |
| 30.00 | 90.0 | 0.5 C | 100.0 | 100.0 |
| 30.00 | 90.0 | 1.0 C | 99.5 | 99.0 |
| 30.00 | 90.0 | 1.5 C | 98.8 | 98.0 |
| 30.00 | 90.0 | 2.0 C | 96.1 | 95.5 |
| 35.00 | 100.0 | 0.5 C | 100.0 | 100.0 |
| 35.00 | 100.0 | 1.0 C | 99.0 | 97.5 |
| 35.00 | 100.0 | 1.5 C | 97.2 | 96.3 |
| 35.00 | 100.0 | 2.0 C | 94.8 | 89.8 |
| 40.00 | 115.0 | 0.5 C | 100.0 | 100.0 |
| 40.00 | 115.0 | 1.0 C | 98.8 | 95.0 |
| 40.00 | 115.0 | 1.5 C | 96.5 | 92.1 |
| 40.00 | 115.0 | 2.0 C | 93.1 | 86.8 |
| 50.00 | 140.0 | 0.5 C | 100.0 | 100.0 |
| 50.00 | 140.0 | 1.0 C | 98.0 | 92.1 |
| 50.00 | 140.0 | 1.5 C | 95.4 | 85.1 |
| 50.00 | 140.0 | 2.0 C | 90.1 | 75.0 |
| 60.00 | 170.0 | 0.5 C | 100.0 | 100.0 |
| 60.00 | 170.0 | 1.0 C | 95.2 | 87.8 |
| 60.00 | 170.0 | 1.5 C | 90.0 | 75.5 |
| 60.00 | 170.0 | 2.0 C | 82.0 | 68.0 |
| 65.00 | 180.0 | 0.5 C | 100.0 | 100.0 |
| 65.00 | 180.0 | 1.0 C | 94.5 | 85.2 |
| 65.00 | 180.0 | 1.5 C | 88.0 | 72.3 |
| 65.00 | 180.0 | 2.0 C | 80.1 | 64.2 |
| 70.00 | 190.0 | 0.5 C | 100.0 | 100.0 |
| 70.00 | 190.0 | 1.0 C | 90.0 | 82.8 |
| 70.00 | 190.0 | 1.5 C | 78.0 | 67.1 |
| 70.00 | 190.0 | 2.0 C | 69.0 | 55.0 |

As shown in Table 4, the cells according to the Examples had improved rate capability compared with the cells according to the Comparative Examples under a same set of conditions of electrode thickness and loading amount of the active material. In particular, the cell including a positive active material in a loading amount ranging from 35 mg/cm$^2$ to 65 mg/cm$^2$ had a particularly improved rate capability.

While this invention has been described in connection with certain exemplary embodiments, it is to be understood that the invention is not limited to the disclosed embodiments, but, on the contrary, is intended to cover various modifications included within the spirit and scope of the appended claims, and equivalents thereof.

What is claimed is:

1. A rechargeable lithium battery, comprising:
   a positive electrode comprising from about 35 mg/cm$^2$ to about 65 mg/cm$^2$ of a positive active material and having a thickness from about 100 μm to about 180 μm;
   a negative electrode comprising a negative active material;
   a liquid electrolyte comprising a lithium salt and a non-aqueous organic solvent; and
   a separator interposed between the negative electrode and the positive electrode and comprising a support and a fluoro-based polymer layer on each side of the support which is adapted to interface with the negative electrode or the positive electrode, the thickness of the fluoro-based polymer layer being from about 2 μm to about 6 μm,
   wherein the positive electrode further comprises a binder selected from the group consisting of polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and combinations thereof.

2. The rechargeable lithium battery of claim 1, wherein the non-aqueous organic solvent comprises a cyclic carbonate in an amount greater than or equal to about 20 volume % based on a total volume of the electrolyte.

3. The rechargeable lithium battery of claim 1, wherein the fluoro-based polymer comprises polyvinylidene fluoride.

4. The rechargeable lithium battery of claim 1, wherein the support comprises at least two layers.

5. The rechargeable lithium battery of claim 1, wherein the support comprises a polyolefin-based polymer layer.

6. The rechargeable lithium battery of claim 5, wherein the polyolefin-based polymer layer comprises a polymer selected from the group consisting of polyethylene, polypropylene, or a combination thereof.

* * * * *